United States Patent
Murakami et al.

[11] 3,805,063
[45] Apr. 16, 1974

[54] DETECTING DEVICE FOR FOCUSING IN OPTICAL INSTRUMENT

[75] Inventors: Sanjiro Murakami, Kobe; Haruhisa Kawata, Osaka, both of Japan

[73] Assignee: Minolta Camera Kabushiki Kaisha, Osaka-fu, Japan

[22] Filed: Oct. 21, 1971

[21] Appl. No.: 190,939

[52] U.S. Cl. ................................. 250/212, 95/44 R
[51] Int. Cl. ............................................ H01j 39/12
[58] Field of Search .......... 250/209, 212, 234, 208; 356/125, 222; 95/44 R

[56] References Cited
UNITED STATES PATENTS

| | | | |
|---|---|---|---|
| 2,573,729 | 11/1951 | Rath | 250/212 X |
| 3,493,764 | 2/1970 | Craig | 356/125 X |
| 3,028,499 | 4/1962 | Farrall | 250/212 X |
| 3,424,908 | 1/1969 | Sitter | 250/212 X |

*Primary Examiner*—Walter Stolwein
*Attorney, Agent, or Firm*—Watson, Cole, Grindle & Watson

[57] ABSTRACT

A plurality of photoelectric elements connected in series to each other are arranged on an image plane through an objective lens of an optical instrument, a variable divided voltage of a separate electric source is loaded across said photoelectric elements connected in series for arranging the output voltage of said photoelectric elements connected in series to each other to hold it near on zero voltage, and a galvanometer connected across said photoelectric elements connected in series detects the minimum voltage for detecting a focusing point of an object on the image plane through the objective lens, by changing the spacing between the lens and the image plane.

6 Claims, 7 Drawing Figures

INVENTOR
Sanjiro Murakami
Haruhisa Kawata
BY Watson, Cole, Grindle & Watson
ATTORNEY

DETECTING DEVICE FOR FOCUSING IN OPTICAL INSTRUMENT

BACKGROUND OF THE INVENTION

This invention relates to a detecting device for focusing in an optical instrument and particularly to a detecting device for detecting the focusing in high sensitivity.

In the prior art, there has been offered a means for detecting the focusing through swinging of an ammeter without relying only on observing the focusing image.

An embodiment possible as a fundamental construction is shown in FIG. 1 and the circuit materialized thereof is shown in FIG. 2.

The principle thereof is as follows: On an image plane through an objective lens, a light and dark pattern is formed corresponding to a light and dark pattern of an object, however, the minimum illuminance point takes the local minimum value when the object is perfectly focused, and when the object is defocused the illuminance is increased. Therefore, by looking for a point where the illuminance of said minimum illuminance point takes the local minimum value that very point is proved to be a focused point. This fact can be obtained by looking for the local maximum value of illuminance of the maximum illuminance point. In order to materialize this fact it is required to look for the minimum illuminance or the maximum illuminance point.

For this purpose, it is required that, as shown in FIG. 2, photovoltaic cells such as silicon solar cells or photoelectric elements $D_1$, $D_2$, —such as photo-transistors and photo-diodes are connected in series to each other and arranged on an image plane. Said photoelectric elements are provided with a characteristic to generate a current proportional to the light intensity received when the voltage across said photoelectric elements is low. As the result, at the time when the voltage across said photoelectric elements is near to zero, the current generated by said photoelectric elements connected in series to each other coincides nearly with the current generated by a photoelectric element on which the light received is a minimum.

In order to render both terminal voltages of said photoelectric elements connected in series to each other as described above to zero voltage, a divided voltage of the voltage of separate electric power 4 is taken out by means of potentiometer 5 and impressed across said photoelectric elements connected in series to each other by way of ammeter 3 and resistance 6 (this resistance 6 includes the internal resistance of ammeter 3, too), and further galvanometer 2 is connected across said photoelectric elements connected in series to each other.

And, while the objective lens and the image plane are relatively moved, potentiometer 5 is adjusted as the fact that the voltage between a and b turns to zero is detected by galvanometer 2 and the value of ammeter 3 at that time is read, and when said value turns to the local minimum value a current generated by said photoelectric elements connected in series to each other also turns to the local minimum value, therefore, at this juncture the image of the object can be detected to be focused on the image plane through the objective lens.

However, it is very troublesome in operating that as described above, while the objective lens and the image plane are relatively moved and that the potentiometer is operated, the fact that the voltage between a and b turns to zero is measured by the galvanometer and further the indication of ammeter is read. In practice, therefore, it is also thinkable that instead of the potentiometer between a and b, an automatic compensation circuit is connected to hold the voltage between a and b on zero, however, doing this causes the circuit of the instrument to be complicated.

Besides, the current running through the ammeter is varied broadly in its value in accordance with the brightness of image, therefore, as an ammeter used is required to have a wide measuring range, and when the measuring range is wide the swinging angle of pointer becomes small relative to the variation of unit current and the sensitivity becomes low, and accordingly the detection sensitivity for focusing also becomes low.

SUMMARY OF THE INVENTION

The present invention overcomes the above-mentioned drawback, and one object of the present invention is to provide a detecting device for detecting the focusing of an objective image on an image plane depending upon presence of current generated by a plurality of photoelectric elements connected in series to each other and arranged on the image plane.

Another object of the present invention is to provide a detecting device for detecting in high sensitivity the focusing of an objective image on an image plane, by holding the voltage across a plurality of photoelectric elements connected in series to each other and arranged on the image plane nearly on zero voltage by means of a variable divided voltage of the voltage of the separate power source and detecting presence of current generated thereby by means of a high sensitive galvanometer.

Further another object of the present invention is to provide a detecting device for detecting the focusing of an objective image on an image plane making use of a battery as a separate power source and a photoconductive element for receiving light rays from an object for which the focus is detected.

In order to attain the above-mentioned objects, in the present invention it is only required to find out, for detecting the focusing, that the current generated by a plurality of photoelectric elements connected in series to each other and arranged on the image plane takes the local minimum value, and there is no need of finding out the absolute value of current generated thereby. And, in order to detect said local minimum value, by observing presence of variation of the current generated it is only required to find out a point where said variation is stopped. In FIG. 1 and FIG. 2, therefore, when the current generated by photoelectric elements is varied, the galvanometer is shifted to any direction, so that the focusing can be detected by a galvanometer, instead of an ammeter.

That is, in a detecting device for focusing in an optical instrument, a plurality of photoelectric elements connected in series to each other are arranged on an image plane through an objective lens of an optical instrument, a variable divided voltage of a separate electric source is loaded across said photoelectric elements connected in series to each other for arranging the output voltage of said photoelectric elements connected in series to each other to hold it nearly on zero voltage, and a galvanometer connected across said photoelectric elements detects the local minimum voltage for detecting a focusing point of an object on the image plane through the objective lens, by changing the interval between the lens and the image plane.

In said detecting device, while the interval between the lens and the image plane is changed, upon observing the galvanometer it may be found out that said galvanometer is swung away to one side to be once stopped and started again. Said moment when stopped is a moment when the current generated by said photoelectric elements is turned to the local minimum, namely, the objective image is focused.

In effecting said detection in the present invention, an important point is that the voltage across photoelectric elements connected in series to each other is not required to be exactly zero voltage but it is only required to be within the limit to generate a current proportional to light received.

Therefore, the operation to make said voltage zero is only required to adjust so as to approximate said voltage to zero prior to said focusing operation.

DESCRIPTION OF THE PREFERRED EMBODIMENTS

Figure 1:
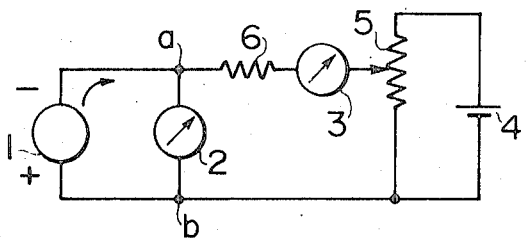
FIG. 1 is a circuit diagram showing the fundamental formation of a prior art detecting device for focusing.
Figure 2:
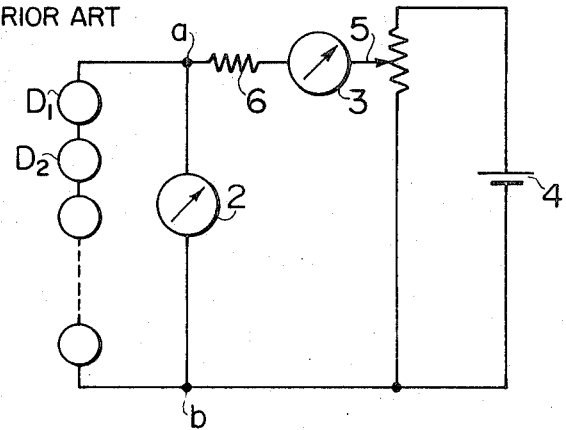
FIG. 2 is a circuit diagram of one example of the prior art referred to above.
Figure 3:
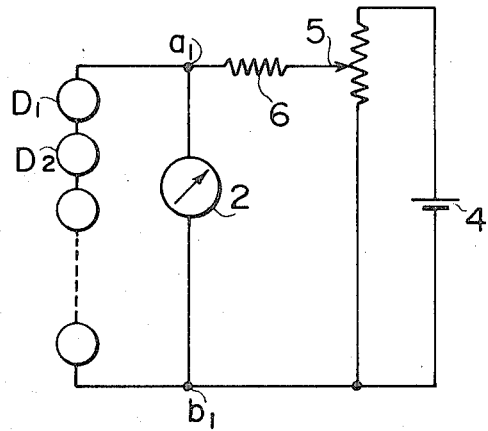
FIG. 3 is a circuit diagram of the first embodiment in accordance with the present invention.

In FIG. 3, photoelectric elements $D_1$, $D_2$, —connected in series to each other are composed of photoelectric elements having the characteristics to generate a current proportional to the received light intensity within the terminal voltage so low as in a photovoltaic cell such as a silicon solar cell, or in a photo-transistor or photo-diode, and arranged on an image plane in an optical instrument not shown in the drawings, for example, a camera or a projector, and receive dividedly light of the objective image pattern through an objective lens.

Galvanometer 2 is connected across both terminals $a_1$ and $b_1$ of said photoelectric elements $D_1$, $D_2$ —.

To separate power source 4 there is connected potentiometer 5 for providing a variably divided voltage, and the divided voltage of potentiometer 5 is connected to both terminals $a_1$ and $b_1$ via resistance 6.

Now, when an objective image is incident upon photoelectric elements $D_1$, $D_2$—connected in series to each other on an image plane through an objective lens, between both terminals $a_1$ and $b_1$ a current from $a_1$ to $b_1$ or from $b_1$ to $a_1$ is generated, however, the current value thereof depends upon the current generated by a photoelectric element of said photoelectric elements $D_1$, $D_2$—which has received the least light of the darkest portion of the objective image pattern. That is, the current generated by a photoelectric element which receives light of the least light rays runs from $a_1$ to $b_1$ or from $b_1$ to $a_1$. As the result, between both terminals $a_1$ and $b_1$ an output voltage corresponding to said current generated comes out, and in order to compensate said output voltage nearly to zero voltage the voltage of separate power source 4 impresses the divided voltage of the reverse polarity across both terminals $a_1$ and $b_1$ by means of potentiometer 5, and thus this fact can be effected by adjusting potentiometer 5.

Next, while the interval between the lens and the image plane is varied, upon observing galvanometer 2 it is found that said galvanometer 2 is swung in accordance with said variation of interval and the current generated by the photoelectric elements connected in series to each other is varied, however, the galvanometer stops to swing at a certain point to show that the current generated is invariable. This very point shows the moment when the objective image is focused on the image plane through the lens.

This fact comes out even though the voltage between both terminals $a_1$ and $b_1$ is zero or not, and accordingly there is no need of holding said voltage generated exactly on zero voltage, and as long as scene light from an object incident upon the objective lens is not varied there is no broad variation, therefore, there is no need of adjusting potentiometer 5 so as to hold said voltage generated always on zero voltage.

Figure 4:
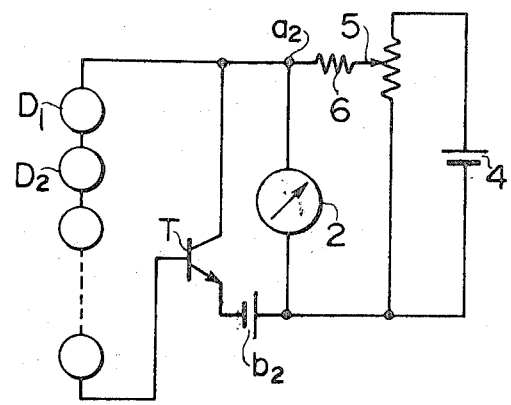
FIG. 4 is a circuit diagram of the second embodiment in accordance with the present invention.

In the embodiment shown in FIG. 4, instead of connecting the photoelectric elements connected in series to each other to the galvanometer directly in parallel as in said first embodiment, the photoelectric current is amplified by transistor T and connected to galvanometer 2 across both terminals $a_2$ and $b_2$ of the amplifer output circuit, and accordingly the variable divided voltage of separate power source 4 by potentiometer 5 also is impressed on said both terminals $a_2$ and $b_2$ so as to approximate the voltage thereof to zero voltage.

Figure 5:
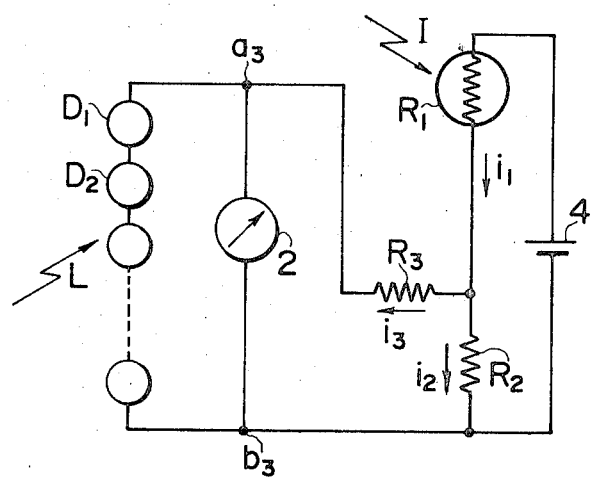
FIG. 5 is a circuit diagram of the third embodiment in accordance with the present invention.
Figure 6:
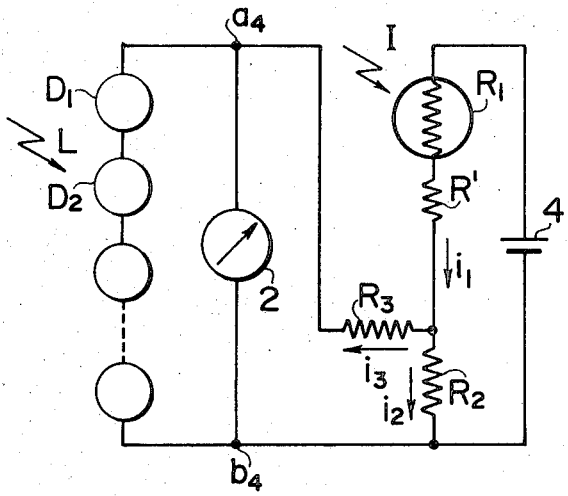
FIG. 6 is a circuit diagram of the fourth embodiment in accordance with the present invention.
Figure 7:
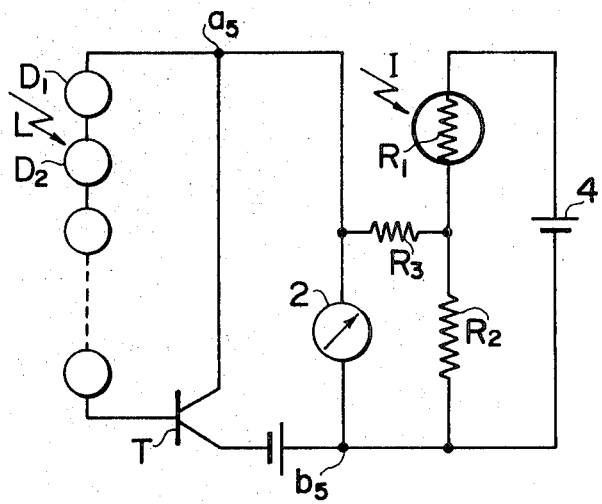
FIG. 7 is a circuit diagram of the fifth embodiment in accordance with the present invention.

In the third, fourth, and fifth embodiments shown respctively in FIGS. 5, 6, and 7, even though scene light is varied the voltage across photoelectric elements connected in series to each other is always held nearly on zero voltage, and there is provided a detecting device not required to adjust the potentiometer unlike the aforementioned embodiments required to be adjusted on all such occasions, and to separate power source 4 there is connected in series thereto photoconductive element $R_1$ into which scene light incident upon the aforementioned photoelectric elements $D_1$, $D_{22}$,—comes.

And thus, in the third embodiment shown in FIG. 5 the voltage of separate power source 4 is divided by photoconductive element $R_1$ and fixed resistance $R_2$ to be loaded on both terminals $a_3$ and $b_3$ of photoelectric elements $D_1$, $D_2$,—connected in series to each other via resistance $R_3$. In the same manner as in the first embodiment galvanometer 2 is connected across both terminals $a_3$ and $b_3$ to photoelectric elements $D_1$, $D_2$,—connected in series to each other.

Now, provided the resistance values of said photoconductive element $R_1$ and resistances $R_2$, and $R_3$ are respectively $r_1$, $r_2$, and $r_3$ and the currents flowing therethrough are respectively $i_1$, $i_2$, and $i_3$, in the case of that the swing of galvanometer 2 is 0.

$$i_1 = i_2 + i_3$$
$$i_2 \cdot r_2 = i_3 \cdot r_3$$

Therefore, provided the electromotive force of power source 4 is E.

$$E = i_1 \cdot R_1 + i_2 \cdot r_2 = i_1 \cdot r_1 + i_3 \cdot r_3$$

Therefore, $r_1 = 1/i_3 \cdot r_2 E/r_2 + r_3 - r_2 r_3/r_2 + r_3$  (1)

Whereas, the swing of galvanometer 2 is zero, so that $i_3$ is equivalent to the current generated by photoelectric elements $D_1$, $D_2$,—and yet equivalent to the current generated by the photoelectric element on which the light quantity received is the least of photoelectric elements $D_1$, $D_2$,—. Provided the light quantity received of said photoelectric element which light quantity received is least is L, $$i_3 = KL$$

Whereas, $r_1$ is constituted so that photoconductive element $R_1$ may receive the same scene light as in said photoelectric element, therefore, provided the received light intensity thereof is I, said both received light intensity L and I become nearly a proportional relationship. In the aforementioned formula (1), when $r_1$ varies in inverse proportion to $i_3$ the voltage between $a_3$ and $b_3$ in FIG. 5 is held nearly on zero voltage. Resistance value $r_1$ of photoconductive element $R_1$ is inversely proportionate to the received light intensity I, namely, $$r_1 \quad 1/I$$

and yet I and L are in inverse proportion, so that $$I \quad L = 1/K \, i_3$$
$$r_1 \quad 1/i_3$$

Therefore, the voltage between $a_3$ and $b_3$ can be approximated to zero voltage.

Further, as shown in the fourth embodiment shown in FIG. 6 when an additional resistance R' having resistance value r' of an appropriate value is connected in series to photoconductive element $R_1$, resistance value $r_1 + r'$ satisfies the aforementioned formula (1) and the voltage between $a_4$ and $b_4$ in FIG. 6 can be automatically held nearly on zero voltage.

FIG. 7 shows the fifth embodiment in accordance with the present invention, and in the same way as in the second embodiment shown in FIG. 4 the current generated by a plurality of photoelectric elements connected in series to each other is amplified once by transistor T, and across said amplifier output terminals $a_5$ and $b_5$ is connected to galvanometer 2, and to separate power source 4 there is connected in series to photoconductive element $R_1$ which receives the same scene light as said photoelectric elements and further to resistance $R_2$ so as to form a circuit. And thus, by connecting the voltage divided by said photoconductive element $R_1$ and resistance $R_2$ to terminals $a_5$ and $b_5$ via resistance $R_3$ it is possible to enhance the precision of focusing as compared with the third embodiment.

In addition, even in this case it is possible to connect additional resistance $R_1$ in series to photoconductive element $R_1$ as shown in the fourth embodiment.

In the present invention, it is not always necessary to hold the voltage across both terminals of the galvanometer on zero voltage. However, making it possible to hold the galvanometer to nearly on zero voltage as in the third and fourth embodiments signifies that no overvoltage is loaded on the galvanometer and accordingly it is significant in view of protecting the galvanometer. Additionally it makes a highly sensitive galvanometer possible to be put to use, resulting in enhancing the precision of focusing.

We claim:

1. In an optical instrument, a device for detecting focusing conditions, comprising:
   an objective lens;
   means for adjusting the focus of said objective lens;
   a number of photovoltaic elements connected in series with one another and mounted at the image plane of said objective lens;
   an electric voltage source for applying a counter voltage at the terminals of said series connected photovoltaic elements through a voltage dividing means for setting the voltage between said terminals to approximately zero; and
   a galvanometer connected in a parallel circuit to said photovoltaic elements to detect the extremum voltage at said terminals during the adjustment of the focus of said objective lens, whereby an image passing through said objective lens is focused at said image plane.

2. A device as in claim 1, further comprising:
   a transistor amplifier having an input connected to said terminals and an output to which said counter voltage is applied and said galvanometer is connected across said output.

3. A device as in claim 1, wherein said voltage dividing means comprises:
   a photoconductive element for receiving light proportional to the intensity of the light received by said series connected photovoltaic elements; and
   a fixed resistance connected in series with said photoconductive element, said electric source being connected with said photoconductive element and fixed resistance in a circuit, whereby the voltage between said terminals is kept approximately zero regardless of the intensity of the light received.

4. A device as in claim 3, wherein said photoconductive element is mounted to receive the light through the objective lens proportional to the intensity of the light received by said series connected photovoltaic elements.

5. A device as in claim 3, wherein an additional resistance is inserted into said circuit.

6. A device as in claim 3, further comprising: a transistor amplifier having an input connected to said terminals and an output to which said counter voltage is applied and said galvanometer is connected across said output.

* * * * *

UNITED STATES PATENT OFFICE
CERTIFICATE OF CORRECTION

Patent No. 3,805,063  Dated April 16, 1974

Inventor(s) Sanjiro Murakami et al

It is certified that error appears in the above-identified patent and that said Letters Patent are hereby corrected as shown below:

[30] Foreign Application Priority Date

Oct. 31, 1970   Japan   Appl'n No. 96208/70

Oct. 31, 1970   Japan   Utility Model Appl'n
                                              No. 108536/70

Signed and sealed this 8th day of October 1974.

(SEAL)
Attest:

McCOY M. GIBSON JR.                C. MARSHALL DANN
Attesting Officer                   Commissioner of Patents